C. E. WHITE.
GUMMING MECHANISM FOR BOX MACHINES, &c.
APPLICATION FILED AUG. 29, 1906.

985,238.

Patented Feb. 28, 1911.
3 SHEETS—SHEET 1.

WITNESSES:
M. E. Flaherty.
M. J. Sheedy.

INVENTOR:
Charles C. White
By
Charles Raymond Bowen
his attorney.

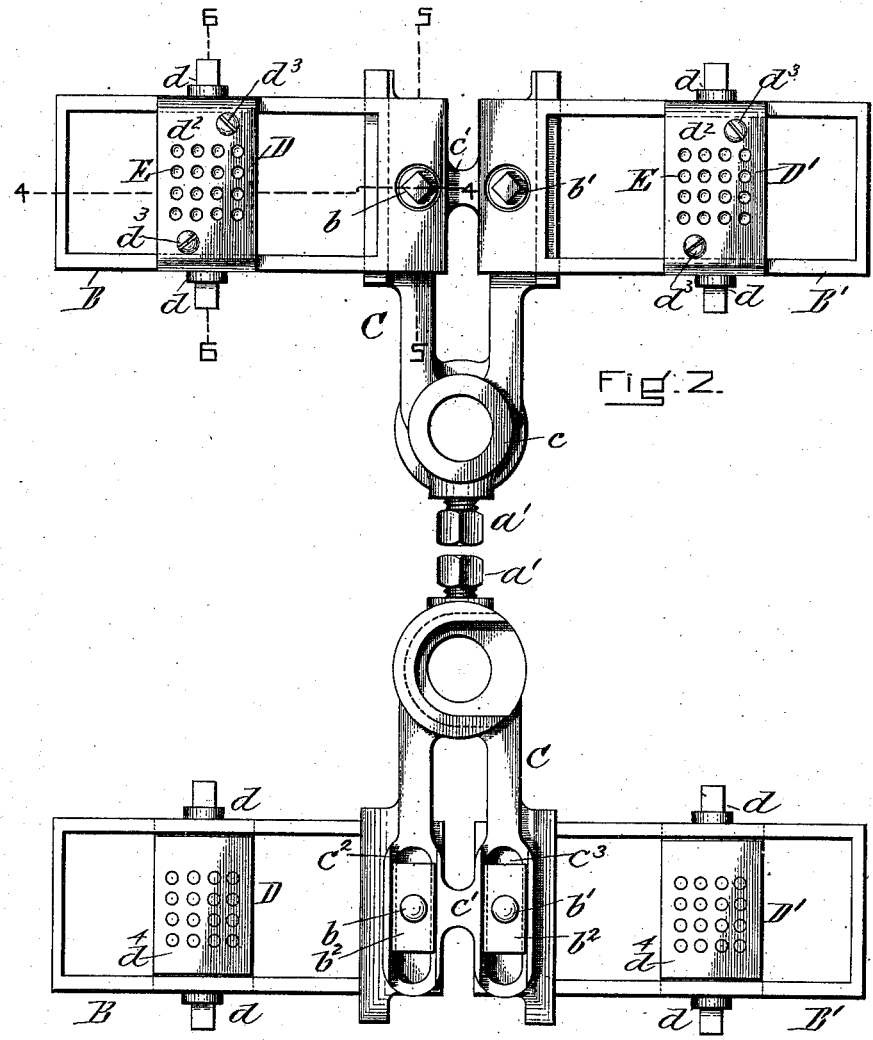

C. E. WHITE.
GUMMING MECHANISM FOR BOX MACHINES, &c.
APPLICATION FILED AUG. 29, 1906.

985,238.

Patented Feb. 28, 1911.

3 SHEETS—SHEET 3.

UNITED STATES PATENT OFFICE.

CHARLES E. WHITE, OF QUINCY, MASSACHUSETTS, ASSIGNOR TO AMERICAN TYPE FOUNDERS COMPANY, OF JERSEY CITY, NEW JERSEY, A CORPORATION OF NEW JERSEY.

GUMMING MECHANISM FOR BOX-MACHINES, &c.

985,238. Specification of Letters Patent. Patented Feb. 28, 1911.

Application filed August 29, 1906. Serial No. 332,488.

*To all whom it may concern:*

Be it known that I, CHARLES E. WHITE, of Quincy, in the county of Norfolk and State of Massachusetts, a citizen of the United States, have invented a new and useful Improvement in Gumming Mechanism for Box-Machines and the Like, of which the following is a specification.

My improvement relates more particularly to the class of gummers described in an application for Letters Patent of the United States, filed June 9, 1906 by Eugene H. Taylor, Serial No. 321,032, in which there is shown a gum box into which the gummer descends until it is submerged in the gum and then rises into contact with the under surface of the blank to which the gum is to be applied.

In the preferred form of my gummer the gum is applied by a series of independent fingers which are held in clusters in a frame, each finger, however, being capable of yielding independently of all the others, preferably against the force of a spring which will return it to its normal position, and each finger preferably, also, having a slight cavity in its gumming tip so that each finger will carry not only the gum which would naturally adhere to it but also the gum contained in the cavity from the gum box, to the surface to which the gum is to be applied. In a gummer of this character a somewhat longer stroke should be given than in the case of the gummer described in the Taylor application for the reason that the gumming fingers all yield and hence may be used to impress the blank with gum.

My invention will be understood by reference to the drawings, in which—

Figure 1:
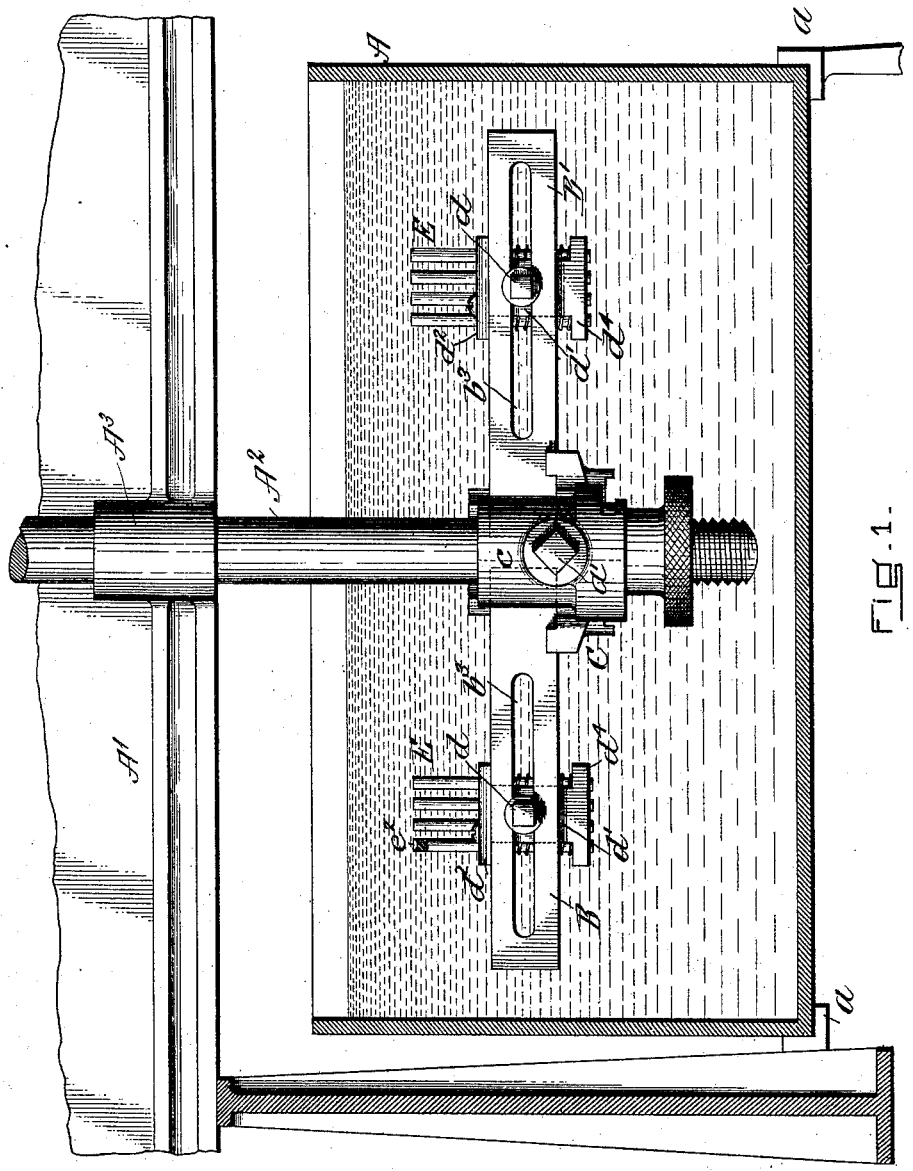
Figure 4:
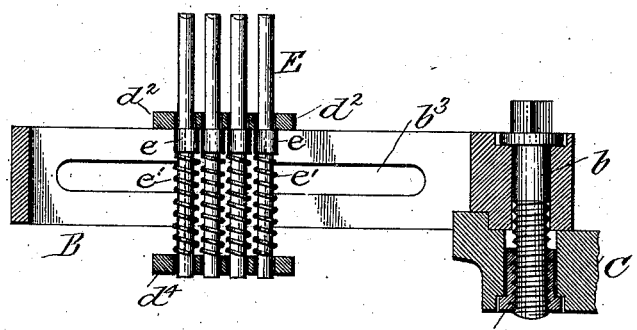
Figure 5:
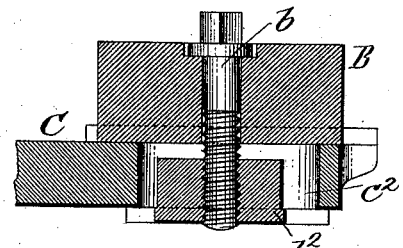
Figure 6:
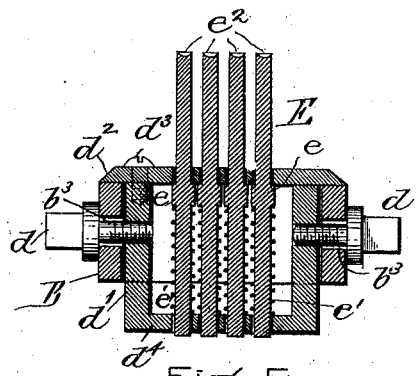

Figure 1 is a vertical section through the gum box showing the submerged gummer. Fig. 2 is a plan view of the gummer. Fig. 3 is a plan of the under surface of the gummer. Fig. 4 is a section on line 4—4 of Fig. 2. Fig. 5 is a section on line 5—5 of Fig. 2, and Fig. 6 is a section on line 6—6 of Fig. 2.

A is the gum box which is supported in a suitable manner as for example by brackets $a$ upon the box-making machine the frame of which is shown at $A^1$. A reciprocating rod $A^2$ passing through an eye $A^3$, carries at its lower end the frame of the gummer. This frame may be of a variety of shapes according to the shape of the surface of the blank to which gum is to be applied, and in the same way the gum-carrying surfaces are arranged according to the shape of the said surface of the blank.

The frame as shown in the drawings comprises two supports B, $B^1$ which are attached by screws $b$, $b^1$ to a yoke-piece C carrying an eye $c$ which fits onto the reciprocating rod $A^2$ and is held in place thereon by a set screw $a^1$. The yoke-piece C is preferably strengthened by a web $c^1$. The means for attaching the yoke-piece C to the rod $A^2$ will not be further described in detail as it is fully described in the said Taylor application, but in the present case each arm of the yoke-piece has a slot $c^2$, $c^3$ through which the screws $b$, $b^1$ pass and each screw has on its lower end a nut $b^2$ so that by locking each screw, the position of each support B, $B^1$ may be adjusted toward and from the axis of the reciprocating rod $A^2$, after which the screws are tightened again.

The gumming sections comprise rectangular boxes D, $D^1$ of which the two ends are open. Each side of each support B, $B^1$ is slotted as at $b^3$ and set screws $d$ are provided which pass through these slots and into the side walls $d^1$ of the boxes. The top $d^2$ of each box overlaps the sides and forms a rest which rests upon the sides of its support, the top of the box being held to its sides by screws $d^3$.

The fingers by which the blanks are gummed are shown at E. Each has a collar $e$ which limits the upward movement of its finger through the top of the box, the under surface of the collar serving also as a rest for its spring $e^1$, the lower end of the spring resting upon the inner surface of the bottom $d^4$ of the box, this construction being such that any pressure upon the top of a finger will depress it, but when the pressure is released the finger will resume its original position. These fingers pass through both the top and bottom of the box so that these parts serve as guides to the fingers insuring their movement in a right line and hence preventing any binding or bending of any finger. Each spring $e^1$ encircles its finger. Each finger has a slight cup-shaped cavity $e^2$ in its top sufficient to hold say a drop of gum.

When it is borne in mind that the stroke of the reciprocating rod $A^2$ is sufficient alternately to submerge the gummer in the gum box, as shown in Fig. 1, and to cause such an engagement of the gummers with the under surface of the blank to be gummed that they will all be depressed more or less, it is believed that the utility as well as the operation of this mechanism will be understood, and it should be further borne in mind that by loosening the screws $b$, $b^1$ the supports carrying the gumming sections can be moved farther from or nearer to the axis of the reciprocating rod $A^2$ and by loosening the screws $d$ the gumming sections may be moved nearer to or farther from each other as the case may be so that a single gummer may be adjusted to the size of blank to be gummed. It is moreover apparent that different gumming sections may be used upon the same frame according to the surface to be gummed.

It is apparent that while this device as shown is a gumming device, as it makes impressions of gum upon the blank, it becomes in fact a printing or marking device and instead of conveying gum to a surface it may be used equally well with printer's ink or other such material with which it is desired to impress a sheet or blank.

What I claim as my invention is:—

1. A gummer comprising a yoke, two frames adjustably mounted, one on each arm of said yoke, a box located in each frame carrying adjustable fingers, said box being adjustable in said frame, as described.

2. A gummer comprising a yoke, two frames adjustably mounted one on each arm of said yoke, a box located in each frame carrying self-adjusting fingers, said box being adjustable in said frame, in combination with a reciprocating rod, said gummer being adjustably mounted thereon, as set forth.

CHARLES E. WHITE.

Witnesses:
 WILSON FISKE,
 M. E. FLAHERTY.

---

Copies of this patent may be obtained for five cents each, by addressing the "Commissioner of Patents, Washington, D. C."